(12) United States Patent
Yaguchi et al.

(10) Patent No.: US 12,736,119 B2
(45) Date of Patent: Sep. 15, 2026

(54) DIFFERENTIAL DEVICE

(71) Applicant: GKN Automotive Limited, Birmingham (GB)

(72) Inventors: Yuu Yaguchi, Tochigi (JP); Mitsuaki Kakuta, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/958,210

(22) Filed: Nov. 25, 2024

(65) Prior Publication Data

US 2025/0084917 A1 Mar. 13, 2025

Related U.S. Application Data

(63) Continuation of application No. PCT/JP2022/030149, filed on Aug. 5, 2022.

(51) Int. Cl.
*F16H 48/22* (2006.01)
*F16D 23/12* (2006.01)
(Continued)

(52) U.S. Cl.
CPC ............. *F16H 48/22* (2013.01); *F16H 48/08* (2013.01); *F16H 48/26* (2013.01); *F16D 2023/123* (2013.01); *F16H 48/147* (2013.01)

(58) Field of Classification Search
CPC ..................... F16H 48/08; F16H 48/22; F16H 48/06–48/147; F16H 48/26; F16D 2023/123
See application file for complete search history.

(56) References Cited

U.S. PATENT DOCUMENTS 4,838,118 A * 6/1989 Binkley .................. F16H 48/30 475/86
6,537,172 B1 * 3/2003 McAuliffe, Jr. ........ F16H 48/34 475/231
(Continued)

FOREIGN PATENT DOCUMENTS

EP 1323954 A2 * 7/2003 ........... F16H 48/295
JP H0221354 U 2/1990
(Continued)

OTHER PUBLICATIONS

Written Opinion & International Search Report for PCT/JP2022/030149 dated Oct. 25, 2022, (6 pages).
(Continued)

*Primary Examiner* — Tinh T Dang
(74) *Attorney, Agent, or Firm* — Reising Ethington P.C.

(57) ABSTRACT

A differential device is provided with a casing including a first wall, a second wall and a peripheral wall and defining a chamber; a differential gear set housed in the chamber and including a first side gear, a second side gear and pinion gears respectively rotatably supported by pinion shafts; a friction clutch disposed between the first side gear and the first wall to brake the first side gear against the first wall; a cam mechanism disposed outside the casing, contiguous to the second wall and configured to convert a rotational force into a thrust force in a direction of an axis; and a transmission member including plungers elongated in parallel with the axis through intervals between the pinion gears or between the pinion shafts and capable of transmitting the thrust force.

9 Claims, 10 Drawing Sheets

(51) Int. Cl.

| | |
|---|---|
| ***F16H 48/08*** | (2006.01) |
| ***F16H 48/26*** | (2006.01) |
| *F16H 48/14* | (2006.01) |

(56) References Cited

U.S. PATENT DOCUMENTS

| | | | | |
|---|---|---|---|---|
| 2003/0121750 | A1* | 7/2003 | Teraoka .................. | F16H 48/22 192/93 A |
| 2020/0292045 | A1 | 9/2020 | Fukuda | |
| 2021/0348675 | A1* | 11/2021 | Zink ....................... | F16D 23/12 |

FOREIGN PATENT DOCUMENTS

| | | | |
|---|---|---|---|
| JP | 2005249080 | A | 9/2008 |
| JP | 2008309337 | A | 12/2008 |
| WO | WO2019111294 | A1 | 6/2019 |

OTHER PUBLICATIONS

English Translation—International Search Report for PCT/JP2022/030149 dated Oct. 25, 2022, (2 pages).

JP Office Action for JP Application No. 2024-538795 dated Jan. 6, 2026 (8 pages).

* cited by examiner

X
61
83
67
23
65
33
7
75
71
73
9
37
17
3
37
35
91
15
19
1
11
31
5
21

61
65
G
83
67
85
23
71
7
75
73
73t
9
13
33
81
67t

DIFFERENTIAL DEVICE

CROSS REFERENCE TO RELATED APPLICATIONS

This application is a continuation Application of PCT International Application No. PCT/JP2022/030149 filed on Aug. 5, 2022, the entire contents of which are incorporated herein by reference.

TECHNICAL FIELD

The disclosure herein relates to an electronically controlled limited-slip differential (LSD) that is advantageous for differentially outputting torque to equal length axles.

BACKGROUND

As right and left axles in a vehicle do not necessarily rotate in an equal speed, it is required to allow differential motion therebetween. To transmit torque to both the axles with enabling differential motion therebetween, a differential device is used.

When either right or left driving wheel loses traction, the differential device runs idle and loses ability to transmit torque to the other driving wheel. To avoid this situation, some differential devices have mechanisms for limiting differential motion. One example thereof is an electronically controlled limited-slip differential (LSD) with a multi-plate clutch. By increasing or decreasing pressure force onto the multi-plate clutch under the electronic control, a degree of differential limitation changes in response, and a so-called differential lock may be enabled when sufficiently great pressure force is applied. PCT International Publication WO 2019/111294 A1 discloses a related art.

SUMMARY

The multi-plate clutch is required to be adjacent to a side gear and further an actuator for applying the pressure force to the clutch is also required to be adjacent to the multi-plate clutch. In the differential device, the multi-plate clutch and the actuator are necessarily disposed in a biased position toward one end. Then axles on both ends cannot be made equal in length, or the differential device is required to be arranged in a biased position to the right or the left on the vehicle if the axles are made equal in length. Such arrangements lead to any inconvenience, for example any difference in characteristics between the axles. The differential device described below provides a solution for these problems.

According to an aspect, a differential device for outputting torque about an axis, is provided with: a casing including a first wall at a first end in respect of the axis and extending radially, a second wall at a second end in respect of the axis and extending radially, and a peripheral wall connecting the first wall and the second wall, the peripheral wall along with the first wall and the second wall defining a chamber; a differential gear set housed in the chamber and including a first side gear facing to the first wall, a second side gear facing the second wall, pinion shafts respectively extending radially, and pinion gears respectively rotatably supported by the pinion shafts and in mesh with the first side gear and the second side gear, the differential gear set differentially distributing the torque received by the pinion shafts to the first side gear and the second side gear; a friction clutch disposed between the first side gear and the first wall to brake the first side gear against the first wall; a cam mechanism disposed outside the casing, contiguous to the second wall and coaxial with the axis, the cam mechanism being configured to convert a rotational force about the axis into a thrust force in a direction of the axis; and a transmission member including plungers elongated in parallel with the axis through intervals between the pinion gears or between the pinion shafts and capable of transmitting the thrust force, the transmission member being in contact with the friction clutch so as to apply the thrust force to the friction clutch.

BRIEF DESCRIPTION OF THE DRAWINGS

The following detailed description of certain embodiments and best mode will be set forth with reference to the accompanying drawings, in which.

DETAILED DESCRIPTION

Figure 1:
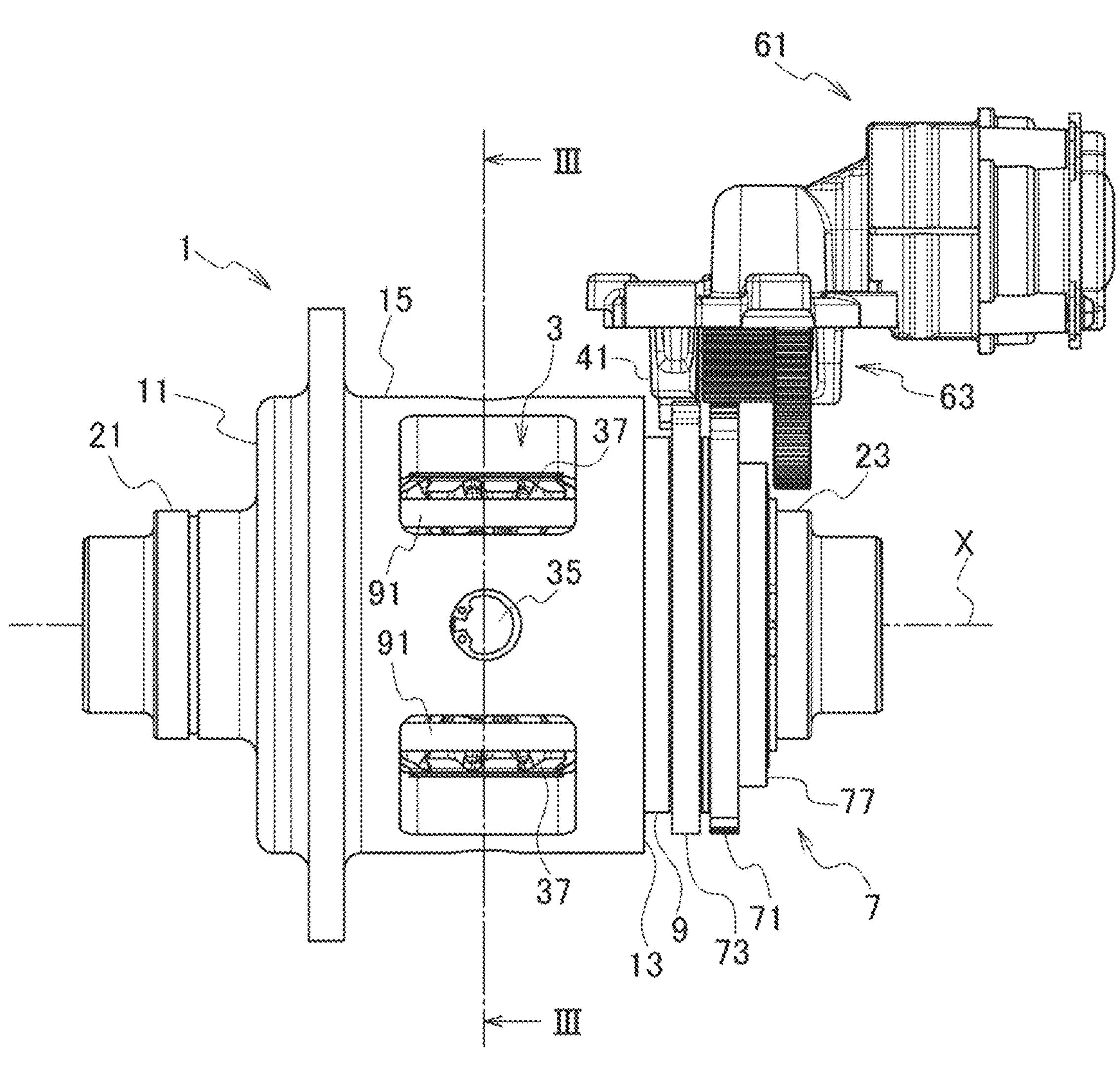
FIG. 1 is an elevational view of a differential device according to an embodiment.

Exemplary embodiments will be described hereinafter with reference to the appended drawings. Throughout the following description and the appended claims, unless otherwise described, an axis means a rotation axis of a differential device. This rotation axis is generally consistent with rotation axes of axles and a cam mechanism while the consistency is not essential. Further, for convenience of explanation, right and left are distinguished, whereas any embodiments would be of course possible where the right and the left were arbitrarily interchanged. Drawings are not necessarily made to scale and therefore it is particularly noted that dimensional relations are not limited to those drawn therein.

While the following descriptions relate to examples of bevel gear differential devices, the embodiments can be, needless to say, based on any other types such as a face gear type.

Referring to FIGS. 1 through 4 for example, the differential device can be used for differentially distributing torque about an axis X to right and left axles. The differential device is generally provided with a casing 1 rotatable about the axis, a differential gear set 3 housed in the casing 1, a friction clutch 5 for limiting differential motion of the differential gear set 3, a cam mechanism 7 disposed at a side opposite to the friction clutch 5 for driving the same, and a transmission member 9 for transmitting thrust force from the cam mechanism 7 to the friction clutch 5. In the example shown in the drawings, a motor 61 combined with a carrier is, from the exterior of the device through a reduction gear set 63, coupled with the cam mechanism 7 to operate the same, thereby exerting the thrust force on the friction clutch 5. According to the respective examples shown in FIGS. 6 through 8, however, the motor 61 may be disposed coaxially with the differential device.

Referring again to FIG. 1 mainly, the casing 1 generally but not essentially consists of a first wall 11 at its left end, which is substantially perpendicular to the axis X and extends radially, a second wall 13 opposed thereto, and a peripheral wall 15 connecting the walls 11 and 13, where the walls 11, 13 and 15 define a chamber housing the gear set 3 and the friction clutch 5. From the first wall 11 a boss 21 projects axially, from the second wall 13 a boss 23 projects axially, and these bosses supported by bearings of the carrier make the casing 1 as a whole be rotatable about the axis X. The casing 1 may be coupled with a ring gear to receive torque from an engine or a driving motor although the ring gear is not drawn in FIG. 1.

Figure 3:
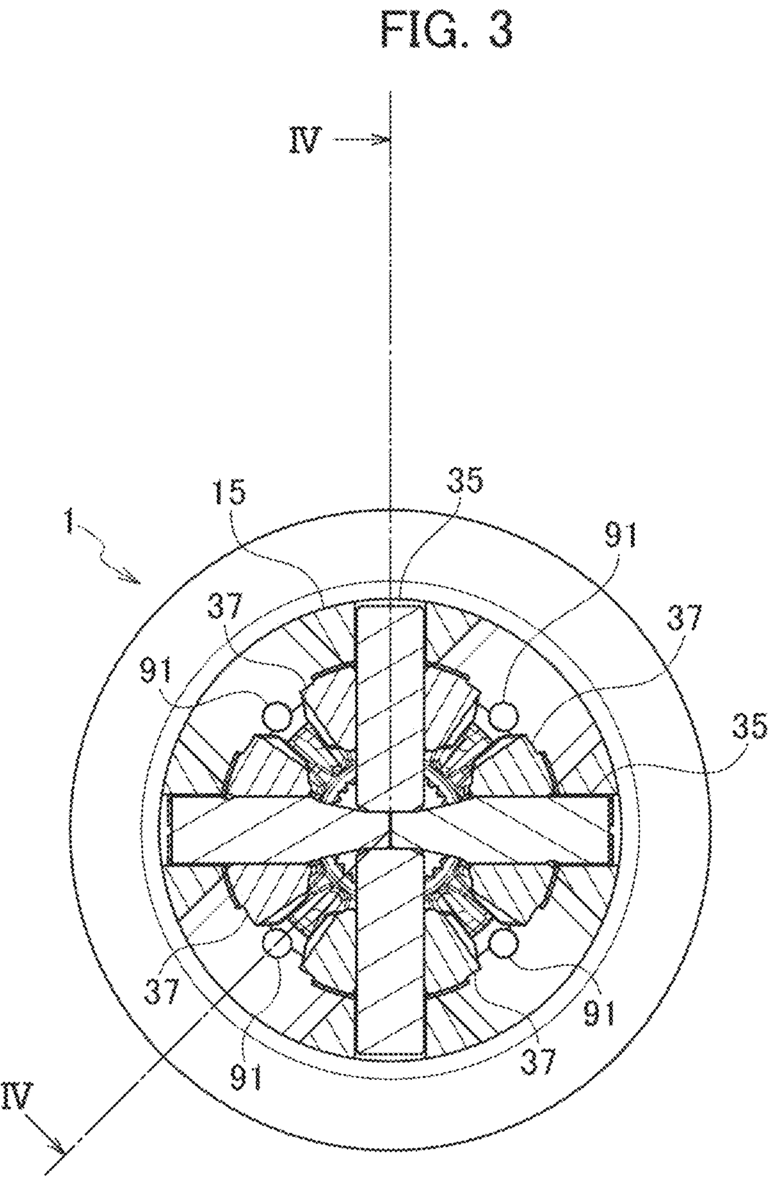
FIG. 3 is a sectional side view of the differential device, taken from a line III-III of FIG. 1.
Figure 4:
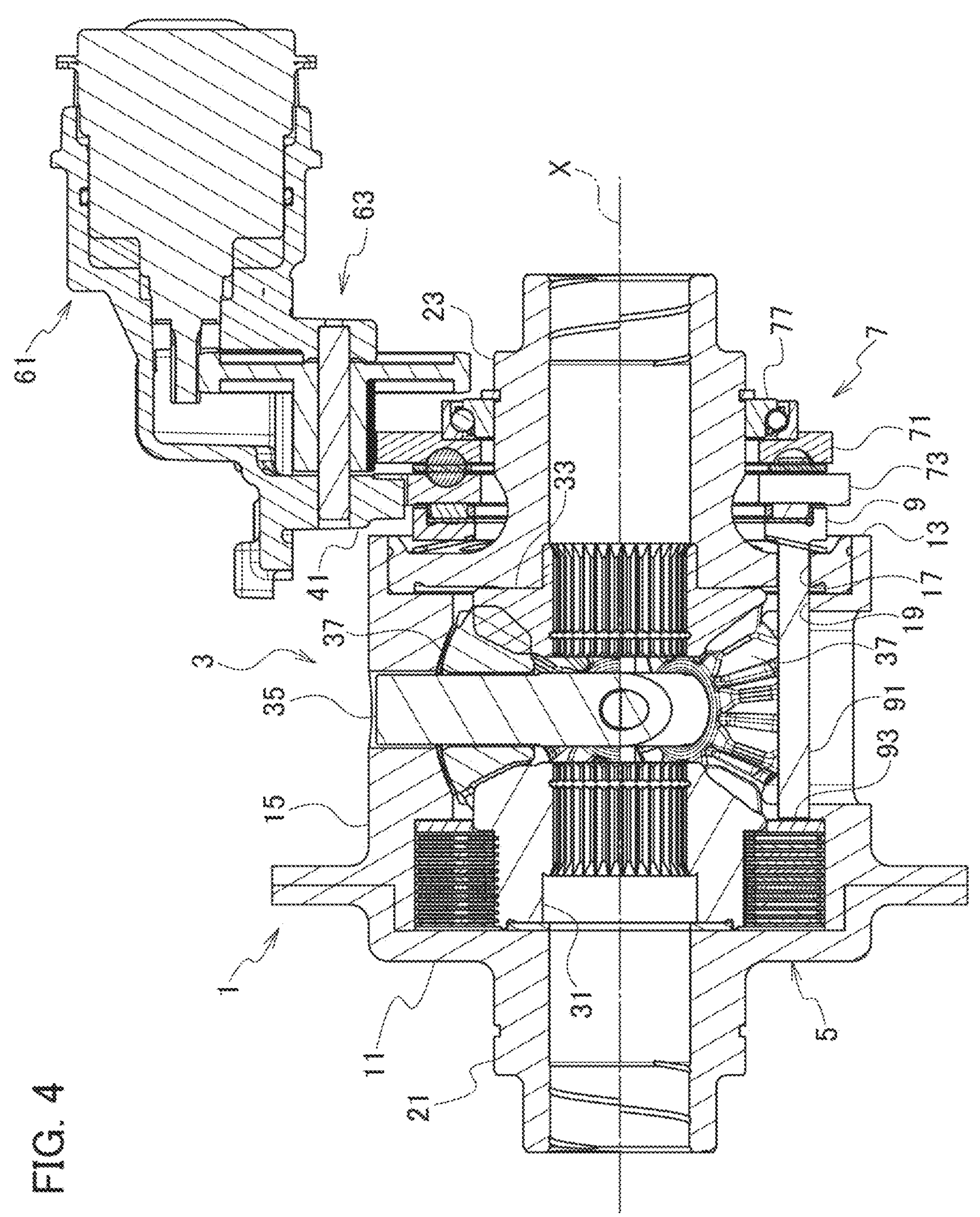
FIG. 4 is a sectional view of the differential device, taken from a line IV-IV of FIG. 2.

The differential gear set 3 is a mechanism for differentially distributing the torque about the axis X to right and left axles. Referring mainly to FIGS. 3 and 4, the differential gear set 3 is provided with one or more pinion shafts 35, pinion gears 37 respectively rotatably supported by the pinion shafts 35, a first side gear 31 and a second side gear 33 respectively meshing with the pinion gears 37.

Each pinion shaft 35 may be a short cylindrical bar and such bars may be so combined as to form a cross shape as shown in the drawings. Each outer end is coupled with the peripheral wall 15, thereby receiving the torque from the casing 1. A so-called C-ring as shown in FIG. 1 for example may be used for the coupling or any other fixation means such as pins or like may be instead used. An alternatively applicable structure in place of these structures is a so-called spider as exemplarily shown in FIG. 8, in which inner ends of the pinion shafts 35 are mutually unitized by means of a ring-like member. The outer ends of the pinion shafts 35 are still alternatively not coupled with the peripheral wall 15 but engaged with any other element (a transmission member 9 in a form of a cage in the example shown in FIG. 8), which intermediates reception of the torque.

Figure 7:
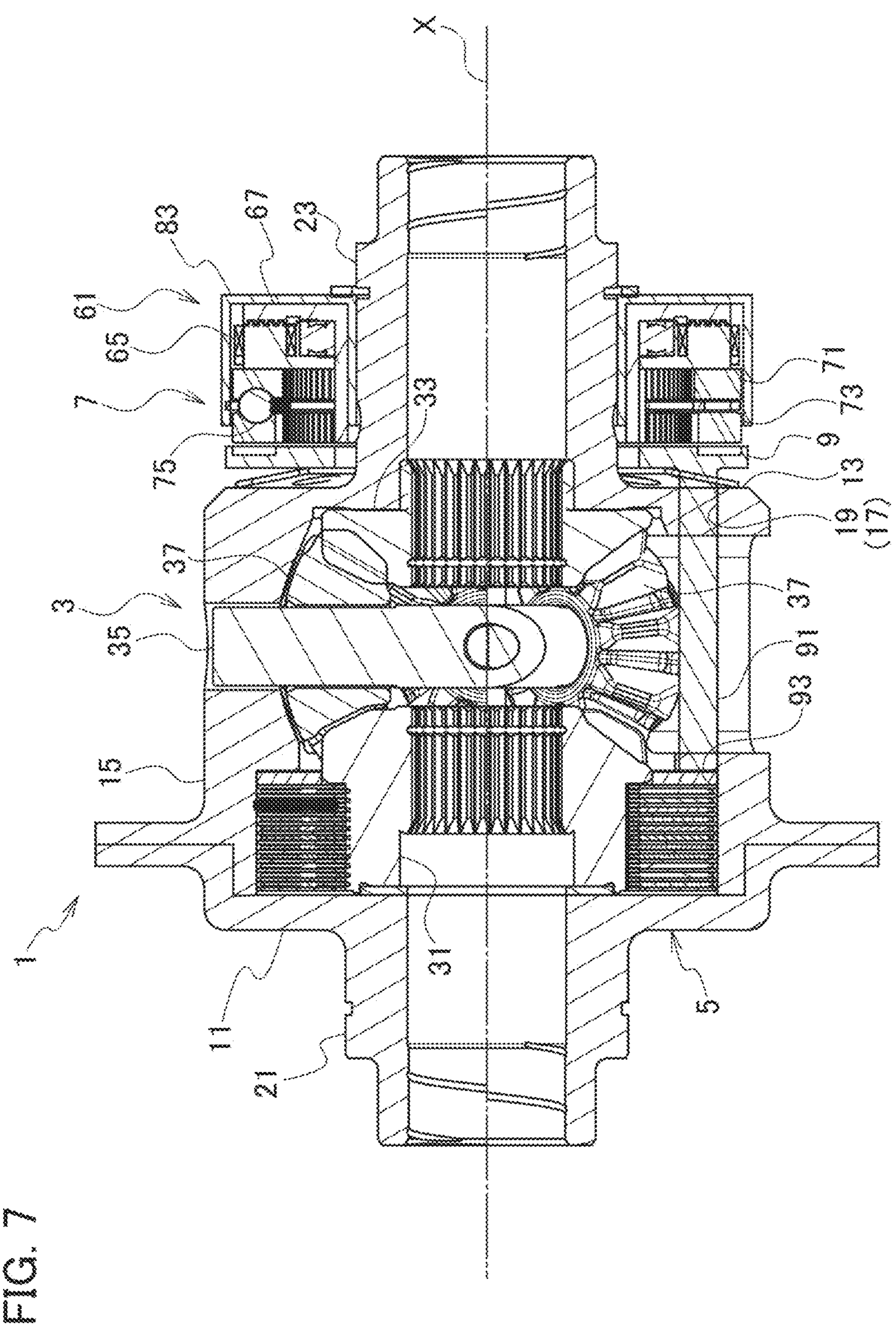
FIG. 7 is a sectional view of the differential device according to another embodiment, which is corresponding to FIG. 4.
Figure 8:
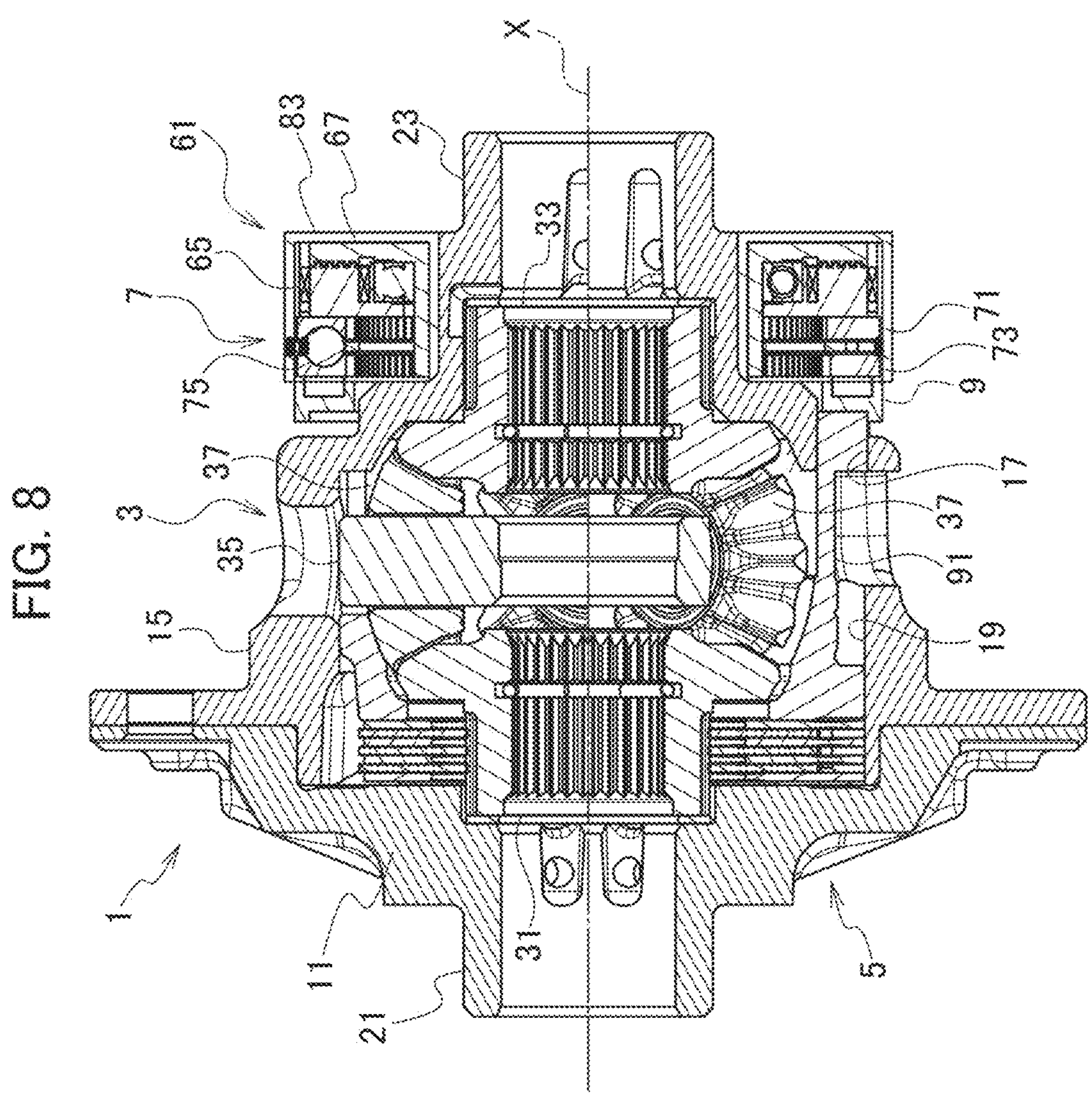
FIG. 8 is a sectional view of the differential device according to still another embodiment, which is corresponding to FIGS. 4 and 7.

Referring to any of FIGS. 4, 7 and 8, the first side gear 31 faces the first wall 11, the second side gear 33 faces the second wall 13, and these gears are respectively coupled with the axles. For coupling, an inner periphery of each side gear 31, 33 is splined or has any equivalent means. By meshing with the pinion gears 37 respectively rotatable about the pinion shafts 35, the side gears 31, 33 both receive the torque and are capable of differentially rotating relative to each other. The differential gear set 3 thereby differentially distributes the received torque to the side gears 31, 33.

The friction clutch 5 is disposed between the first side gear 31 and the first wall 11 to receive thrust force to achieve a braking ability. Although the illustrated example in the drawing relates to a multi-plate clutch, of course any other friction clutch is applicable. In a case where the friction clutch 5 is a multi-plate clutch, the clutch generally consists of outer plates and inner plates alternately layered and each formed in a substantially disk shape. For engagement, the outer plates may have tabs projecting radially outward and the inner plates may have lugs projecting radially inward. Correspondingly the casing 1 may have tab grooves and the first side gear 31 may have lug grooves. When the alternately layered plates receive thrust force in the axial direction through the transmission member 9, the plates create frictional force and thereby brake the first side gear 31 against the first wall 11, thereby limiting the differential motion of the differential gear set 3.

Figure 5:
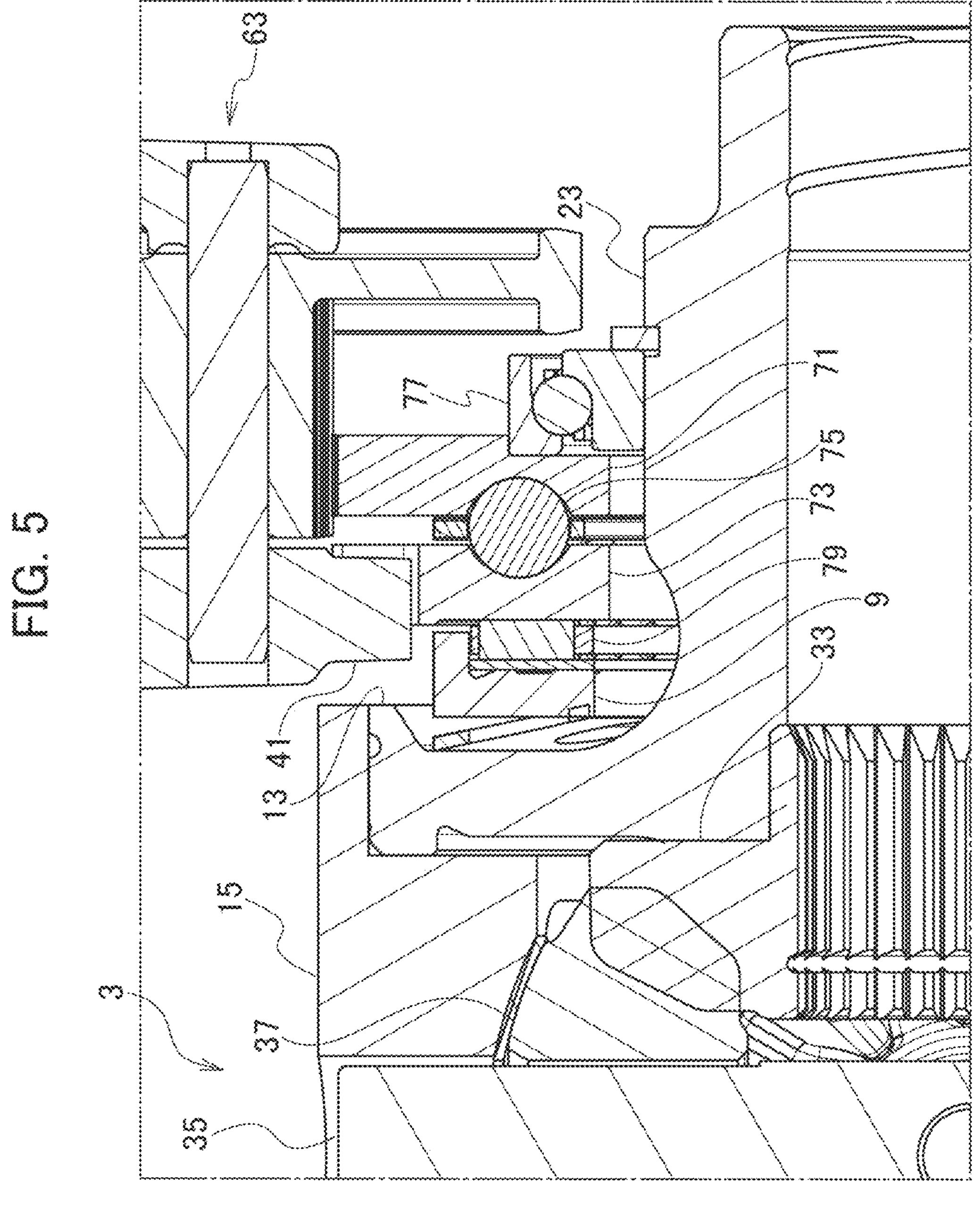
FIG. 5 is a sectional partial elevational view of the differential device, showing an actuator and its surrounding elements.

The cam mechanism 7 is provided with a structure that converts the rotational force by the motor 61 into a thrust force in the axial direction. One example thereof is a combination of a driving plate 71, a thrust plate 73 opposed thereto, and a cam structure interposed therebetween as shown in FIG. 5 in combination with FIG. 4. The cam structure is constituted of slopes formed on one or both plates 71, 73 and cam balls 75 capable of rolling on the slopes. In place of the cam balls, rollers may be used, or without the cam balls or such, the slopes on one plate may be so arranged as to directly slide on projections on the other plate, thereby mutually pressing each other away.

Figure 2:
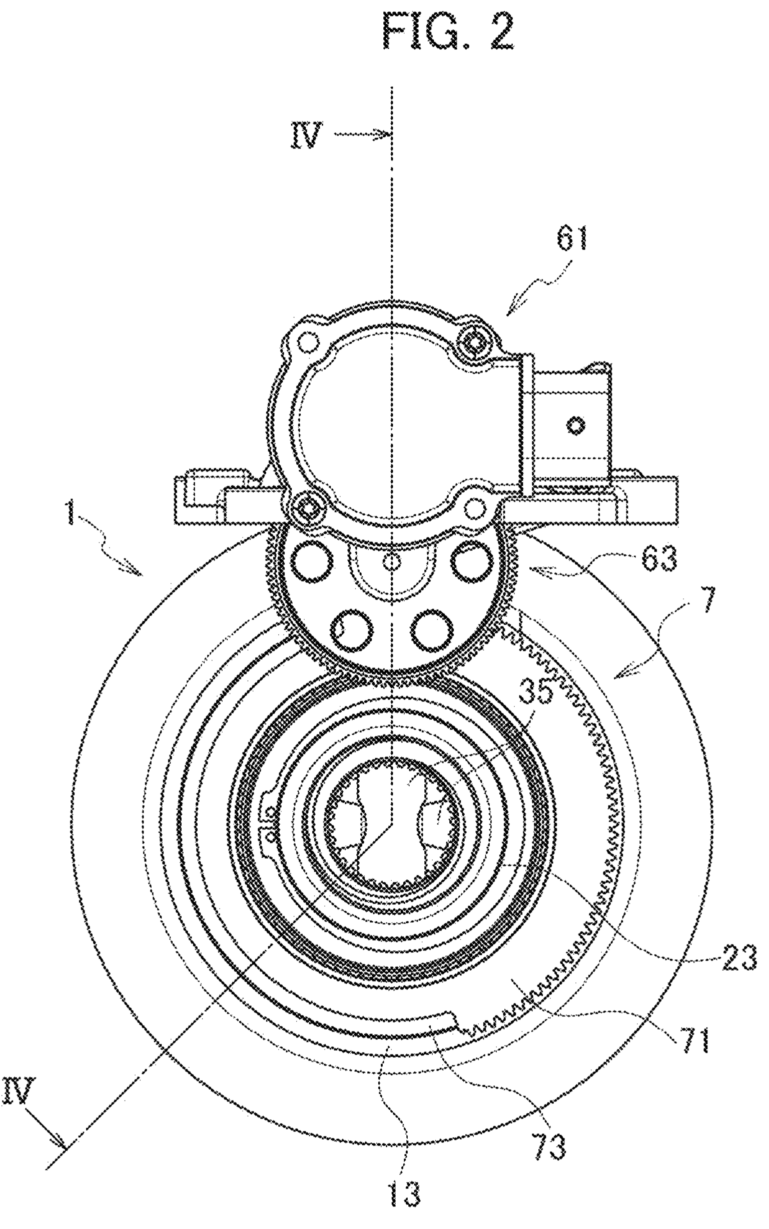
FIG. 2 is a side view of the differential device.

The driving plate 71 is rotatable about the axis X but is axially immovable. A bearing 77 may be interposed between the second boss 23 and the driving plate 71 in order to rotatably support the driving plate 71. As shown in FIG. 2, the driving plate 71 at least on its periphery is provided with gear teeth for meshing with the reduction gear set 63, thereby being driven by the motor 61 via the reduction gear set 63 to rotate about the axis X. On the other hand, the thrust plate 73 is prevented from rotating about the axis X but is axially movable. For anti-rotation, the carrier or the other fixation member may be provided with an engaging section 41. The engaging section 41 engages with the thrust plate 73 to prevent its rotation.

The cam mechanism 7 is, as best shown in FIGS. 4 and 5, disposed outside the casing 1 and contiguous to the second wall 13, and in particular the thrust plate 73 faces the transmission member 9 and can directly exert the thrust force thereon. The transmission member 9, at least in a part opposed to the thrust plate 73, may be formed in a correspondingly flat circular shape. Because the transmission member 9 rotates with the casing 1, a thrust bearing 79 may be interposed between the thrust plate 73 and the transmission member 9. Alternatively, without the thrust bearing, it may be directly in contact with and slides thereon. When the motor 61 makes the driving plate 71 rotates, the interposed cam structure drives the thrust plate 73 in the axial direction, thereby exerting the thrust force on the transmission member 9.

Referring to FIGS. 1, 3 and 4 for example, the transmission member 9 is provided with a plurality of plungers 91, as a unitary body or separate bodies, respectively elongated in parallel with the axis X for the purpose of transmitting the thrust force, from the right end to the left end of the casing 1, to the friction clutch 5. Corresponding to the plungers 91, the second wall 13 has openings 17 passing therethrough, and the plungers 91 respectively pass through the openings 17 to face the cam mechanism 7. Corresponding to the plungers 91, the casing 1 may be further provided with grooves or hollows 19 on the internal face of the peripheral wall 15 so that the plungers 91 are respectively guided by the grooves or hollows 19 and held in parallel with the axis X.

As being understood from FIG. 3 for example, the plungers 91 respectively pass through intervals between the pinion gears 37 to extend from the side of the second wall 13 to the side of the first wall 11. The plungers 91 may be arranged symmetrically about the axis X. This is advantageous in transmitting the thrust force evenly about the axis.

The transmission member 9, on the end of the plungers 91 opposed to the friction clutch 5, may be further provided with a pressure member 93 as a unitary or separate body, which extends continuously in a circumferential direction.

The pressure member 93 can be in face contact with the friction clutch 5, thereby exerting the thrust force evenly about the axis on the friction clutch 5.

Still alternatively, the transmission member 9 as a whole may be, as exemplarily shown in FIG. 8, in the form of a cage enclosing the differential gear set 3. In this case, the transmission 9 at the side facing the friction clutch 5 may be in the form of a bowl receiving the first side gear 31 and the plungers 91 may branch off and extend from its rim. The respective plungers 91 may pass through the intervals between the pinion shafts 35 to extend toward the second wall 13. The plungers 91 may, needless to say, be arranged symmetrically about the axis X.

In this case, further, the internal face of the peripheral wall 15 may be provided with grooves 19 in which the transmission member 9 fits and the plungers 91 may be in contact with side faces of the pinion shafts 35 so that the transmission member 9 can be additionally in charge of torque transmission from the casing 1 to the pinion shafts 35. In this case as well, like as the example described above, the transmission member 9 is in charge of thrust force transmission from the cam mechanism 7 to the friction clutch 5.

Figure 6:
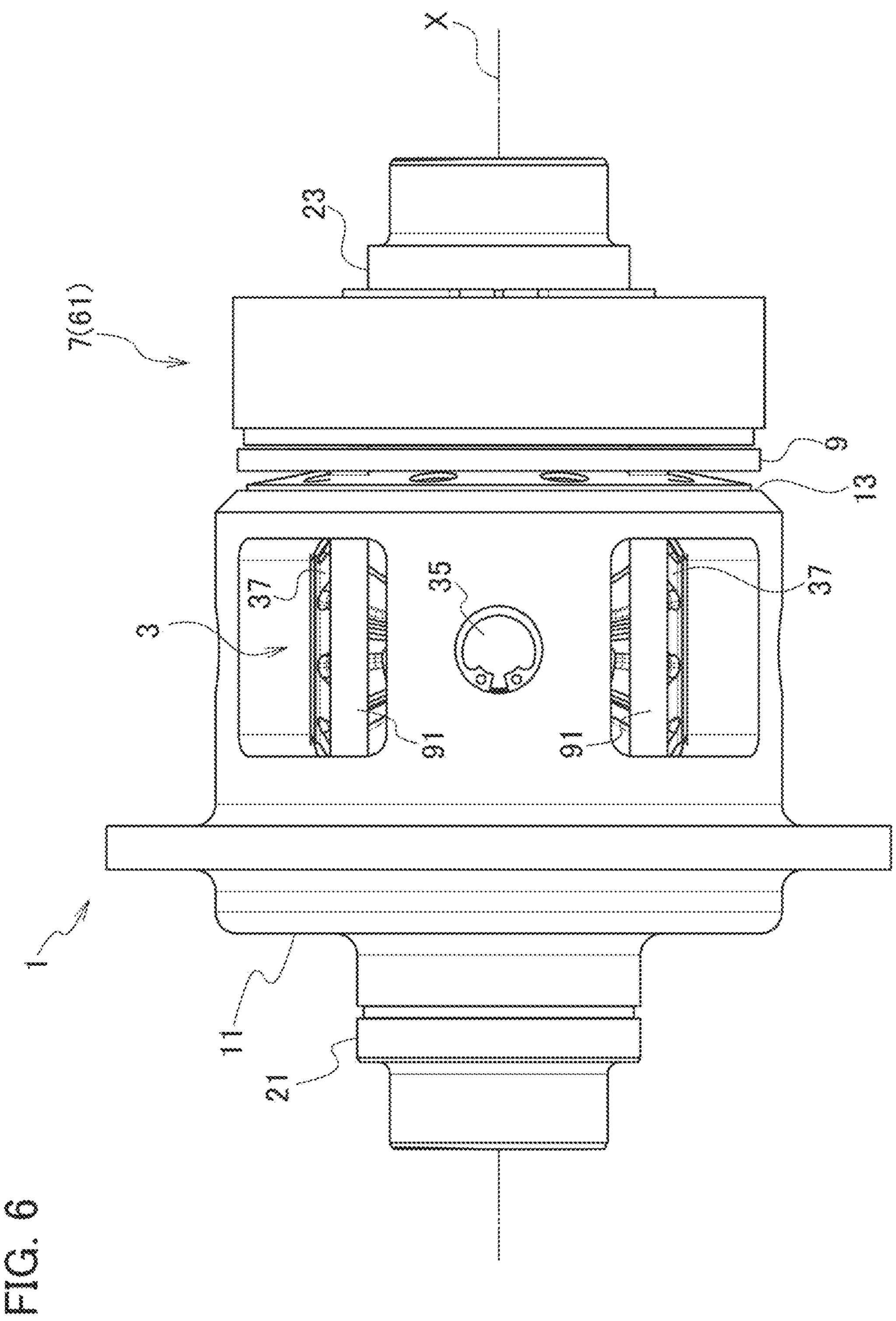
FIG. 6 is an elevational view of a differential device according to another embodiment.

As described already, as in the respective examples shown in FIGS. 6 through 8, the motor 61 may be disposed coaxially with the differential device. In this case, the motor 61 and the cam mechanism 7 may constitute a unitized actuator. These components as a whole are housed in a housing 83 to form a unitized body for example and supported on the boss 23. The unitized actuator as a whole is rotatable relative to the boss 23 but prevented from rotating relative to the carrier. It is made to be axially immovable by means of a C-ring or such relative to the boss 23 or the carrier and reaction force against the force created by the actuator is borne thereby.

Figure 9:
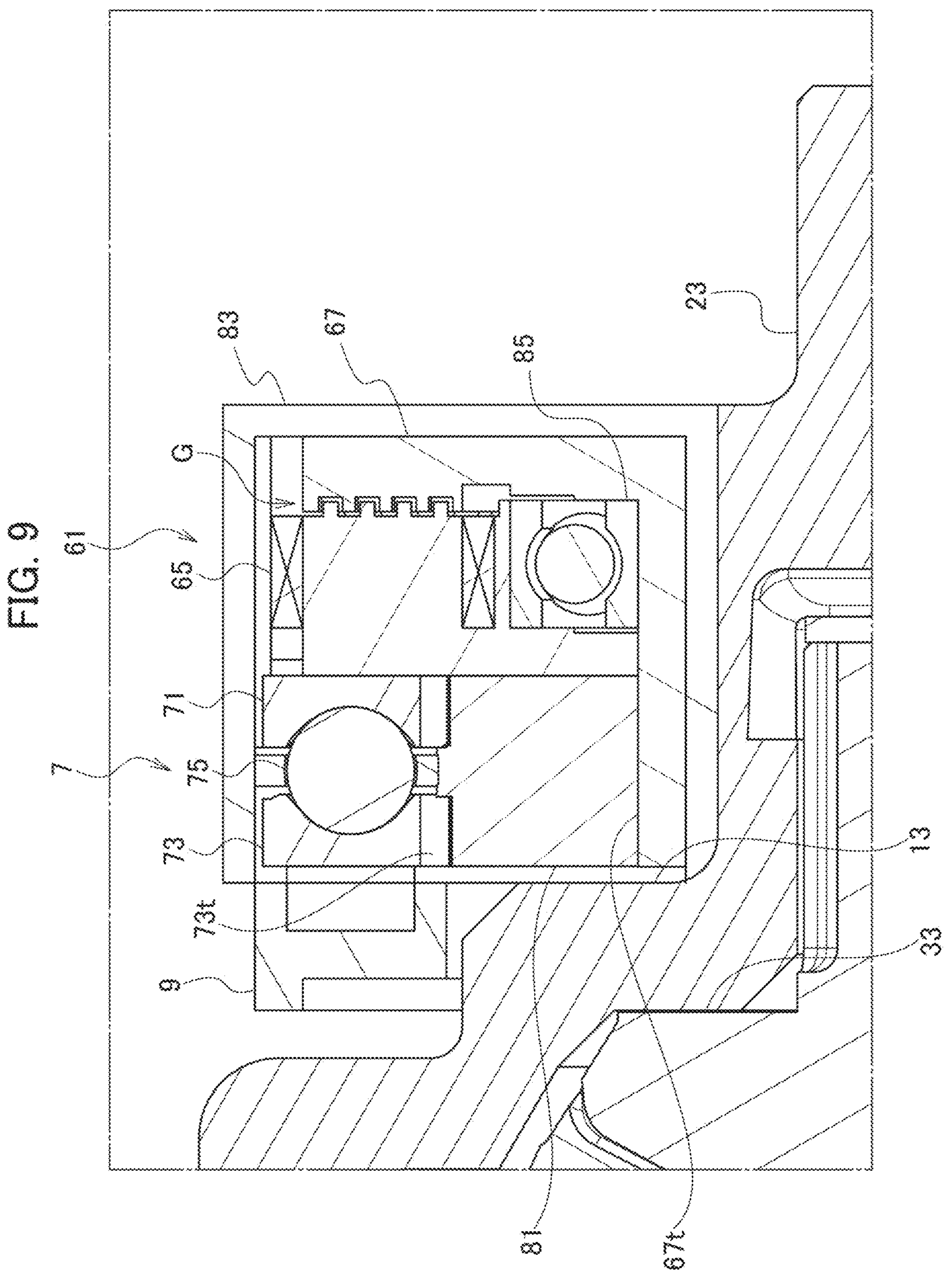
FIG. 9 is a sectional partial elevational view of the differential device, showing an actuator and its surrounding elements.

As best shown in FIG. 9, the motor 61 is, as with the one in the prior art, generally constituted of a rotor 65 and a stator 67 opposite thereto with a gap G therebetween. Although a so-called radial gap motor where the gap G is held radially is applicable, the example shown in the drawing relates to an axial gap motor where the gap G is held axially. While both the rotor 65 and the stator 67 can be disposed coaxially with the axis X, the stator 67 is anti-rotated relative to the housing 83 for example and the rotor 65 is rotatable relative to both these components. Any bearing such as a ball bearing 85 is applicable for the purpose of rotatable support and may be interposed between the rotor 65 and the stator 67 for example. A plurality of coils arranged circumferentially creates a magnetic flux in response to an electric power input and the magnetic flux leaping the gap G drives the rotor 65 into rotational motion about the axis X. The rotor 65 is further coupled with and drives the cam mechanism 7.

Figure 10:
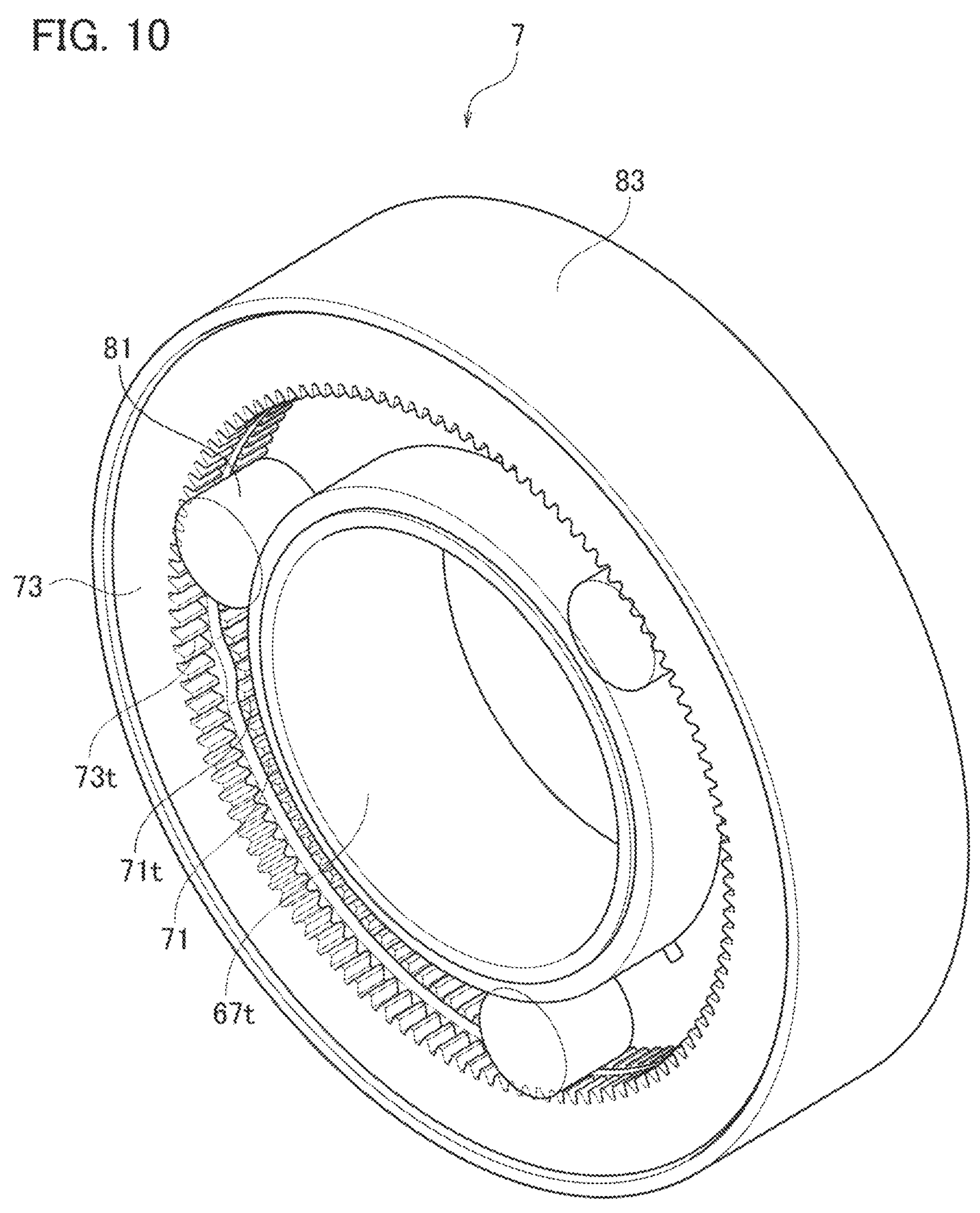
FIG. 10 is a schematic perspective view of a cam mechanism in the actuator shown in FIG. 9.

The cam mechanism 7 may be, as in the example described above with reference to FIG. 5, constituted of the driving plate 71, the thrust plate 73 and the cam balls 75 interposed therebetween. Or, as in the example shown in FIGS. 9 and 10, a mechanism using a planetary gear is alternatively applicable. According to the latter example, the driving plate 71 and the thrust plate 73 are both internal gears having internal teeth 71*t* and 73*t* respectively and are, unlike the example shown in FIG. 5, both rotatable about the axis X. A plurality of planetary gears 81 is in mesh with these internal teeth. The planetary gears 81 are normally arranged symmetrically about the axis X. Radially inside the planetary gears 81, a sun gear section 67*t* having external teeth and anti-rotated is disposed and meshes with the planetary gears 81. In the example shown in the drawing, the sun gear section 67*t* is unitarily elongated from the stator 67 but such a unitary structure is not essential and it may be instead secured to the housing 83 for example.

Because there's a slight difference in the number of teeth between the internal teeth 71*t* of the driving plate 71 and the internal teeth 73*t* of the thrust plate 73, when the motor 61 makes the driving plate 71 rotate, rotation difference occurs between the driving plate 71 and the thrust plate 73. The rotation difference makes the cam balls 75 roll and press up the thrust plate 73, thereby converting the rotational force into the thrust force. Of course, as described already, any cam structure without cam balls is available instead.

Degree of the power boost by the aforementioned cam mechanism 7 is normally greater than a reduction gear and is as well properly regulated by the difference in the number of the teeth. The actuator according to the present embodiment therefore enables controllable output of a particularly greater thrust force as compared with the prior art. As with the example described already with reference to FIG. 5, also in the present embodiment, the thrust plate 73 is contiguous to the transmission member 9 and is capable of actuating the friction clutch 5 through the member 9. The actuator of the present embodiment is alternatively applicable to any other use.

According to any of the embodiments, the friction clutch around the left end in the differential device is substantially identical in size to the cam mechanism around the right end, and therefore its total structure is substantially symmetrical bilaterally. Therefore, as with any differential device without a slip-limitation device, the right and left axles can be made equal in length. As well, the differential device according to any of the present embodiments is not particularly large as compared with the differential device without the slip-limitation device, and may be compatibly used without a substantial vehicle design change.

Although certain exemplary embodiments are described above, modifications and variations of the embodiments will occur to those skilled in the art, in light of the above teachings.

What is claimed is:

1. A differential device for outputting torque about an axis, comprising:

a casing including a first wall at a first end in respect of the axis and extending radially, a second wall at a second end in respect of the axis and extending radially, and a peripheral wall connecting the first wall and the second wall, the peripheral wall along with the first wall and the second wall defining a chamber;

a differential gear set housed in the chamber and including a first side gear facing to the first wall, a second side gear facing the second wall, pinion shafts respectively extending radially, and pinion gears respectively rotatably supported by the pinion shafts and in mesh with the first side gear and the second side gear, the differential gear set differentially distributing the torque received by the pinion shafts to the first side gear and the second side gear;

a friction clutch disposed between the first side gear and the first wall to brake the first side gear against the first wall;

a cam mechanism disposed outside the casing, contiguous to the second wall and coaxial with the axis, the cam mechanism being configured to convert a rotational force about the axis into a thrust force in a direction of the axis;

a transmission member including plungers elongated in parallel with the axis through intervals between the pinion gears or between the pinion shafts and capable of transmitting the thrust force; and a pressure member in face contact with the friction clutch and held between the plungers and the friction clutch so as to transmit and apply the thrust force to the friction clutch, and surrounding on an outer rim of a toothed part of the first side gear.

2. The differential device of claim 1, further comprising:

openings penetrating the second wall and so dimensioned that the plungers respectively pass through the openings to reach the cam mechanism.

3. The differential device of claim 1, wherein the peripheral wall includes grooves or hollows to guide and hold the plungers in parallel with the axis.

4. The differential device of claim 1, wherein the transmission member is formed in a unitary or separate body from the plungers, extends continuously in a circumferential direction.

5. The differential device of claim 1, wherein the clutch includes inner plates engaging with the first side gear and outer plates engaging with the casing, and the inner plates and the outer plates are layered alternately in the direction of the axis to constitute a multi-plate clutch.

6. A differential device for outputting torque about an axis, comprising:

a casing including a first wall at a first end in respect of the axis and extending radially, a second wall at a second end in respect of the axis and extending radially, and a peripheral wall connecting the first wall and the second wall, the peripheral wall along with the first wall and the second wall defining a chamber;

a differential gear set housed in the chamber and including a first side gear facing to the first wall, a second side gear facing the second wall, pinion shafts respectively extending radially, and pinion gears respectively rotatably supported by the pinion shafts and in mesh with the first side gear and the second side gear, the differential gear set differentially distributing the torque received by the pinion shafts to the first side gear and the second side gear;

a cam mechanism disposed outside the casing, contiguous to the second wall and coaxial with the axis, the cam mechanism being configured to convert a rotational force about the axis into a thrust force in a direction of the axis;

a transmission member including plungers elongated in parallel with the axis from the second wall toward the first wall capable of transmitting the thrust force from the cam mechanism; and a multi-plate clutch including outer plates engaging with the casing, inner plates engaging with the first side gear and alternately layered with the outer plates, and a pressure member in face contact with both the plates and the plungers to convert the thrust force into a frictional force on the plates to brake the first side gear against the casing, wherein the first side gear includes a stem part directly engaging with the inner plates and a toothed part in mesh with the pinion gears, and the pressure member adjoins and surrounds on an outer rim of the toothed part.

7. The differential device of claim 6, further comprising:

openings penetrating the second wall and so dimensioned that the plungers respectively pass through the openings to reach the cam mechanism.

8. The differential device of claim 6, wherein the peripheral wall includes grooves or hollows to guide and hold the plungers in parallel with the axis.

9. The differential device of claim 6, wherein the transmission member is formed in a unitary or separate body from the plungers, extends continuously in a circumferential direction.

* * * * *